United States Patent [19]

Oberg

[11] Patent Number: 5,705,893
[45] Date of Patent: Jan. 6, 1998

[54] SIMPLIFIED AUTOMATIC ENERGY SAVING SYSTEM FOR AUTOMOTIVE DAYTIME RUNNING LIGHTS

[76] Inventor: Donald F. Oberg, 309 S. Linwood Beach, Linwood, Mich. 48634

[21] Appl. No.: 252,603

[22] Filed: Jun. 1, 1994

[51] Int. Cl.$^6$ ...................................... B60Q 1/14
[52] U.S. Cl. ................ 315/82; 315/83; 315/149; 315/154; 315/159; 307/10.1; 307/10.8
[58] Field of Search ..................... 315/83, 149, 154, 315/159, 82; 307/10.1, 10.8

[56] References Cited

FOREIGN PATENT DOCUMENTS 1074627  7/1967  United Kingdom ................ 315/83

*Primary Examiner*—Robert Pascal
*Assistant Examiner*—Arnold Kinkead
*Attorney, Agent, or Firm*—Merlin B. Davey

[57] ABSTRACT

An ignition activated automotive headlight system having a high beam circuit and a low beam circuit, the low beam circuit having a resistor in series connection therewith for daylight driving, the low beam circuit further having a photoelectrically operated by-pass circuit around the resistor, thereby permitting normal operation of the low beam circuit for nighttime driving.

1 Claim, 1 Drawing Sheet

SIMPLIFIED AUTOMATIC ENERGY SAVING SYSTEM FOR AUTOMOTIVE DAYTIME RUNNING LIGHTS

BACKGROUND OF THE INVENTION

Daytime running lights for automobiles have been a requirement of the law in Canada since the 1990 model year. It is believed that such lights help prevent collisions by making the vehicles easier to see. Such a requirement has resulted in the provision of ignition operated headlight systems for all automobiles and trucks purchased in Canada since the 1990 model year and many modifications have been proposed for the automatic alteration of the low beam intensity for continuous daytime use to the normal nighttime use. See, for example, U.S. Pat. Nos. 4,686,423; 4,841,199; 5,030,884; 5,075,593 and 5,081,565. All such modifications require complex connections to the automobile electrical system and/or when used to operate low beam headlights, operate them at full brightness resulting in undue power consumption and possible glare.

SUMMARY OF THE INVENTION

The present invention relates to an ignition activated automotive headlight system having a high beam circuit and a low beam circuit, said low beam circuit having a resistor in series connection therewith for use in daylight driving, said low beam circuit further having a photoelectrically operated by-pass circuit around said resistor, said by-pass circuit automatically permitting normal operation of said low beam circuit during dark and nighttime driving.

DETAILED DESCRIPTION OF THE DRAWING AND INVENTION

Figure 1:
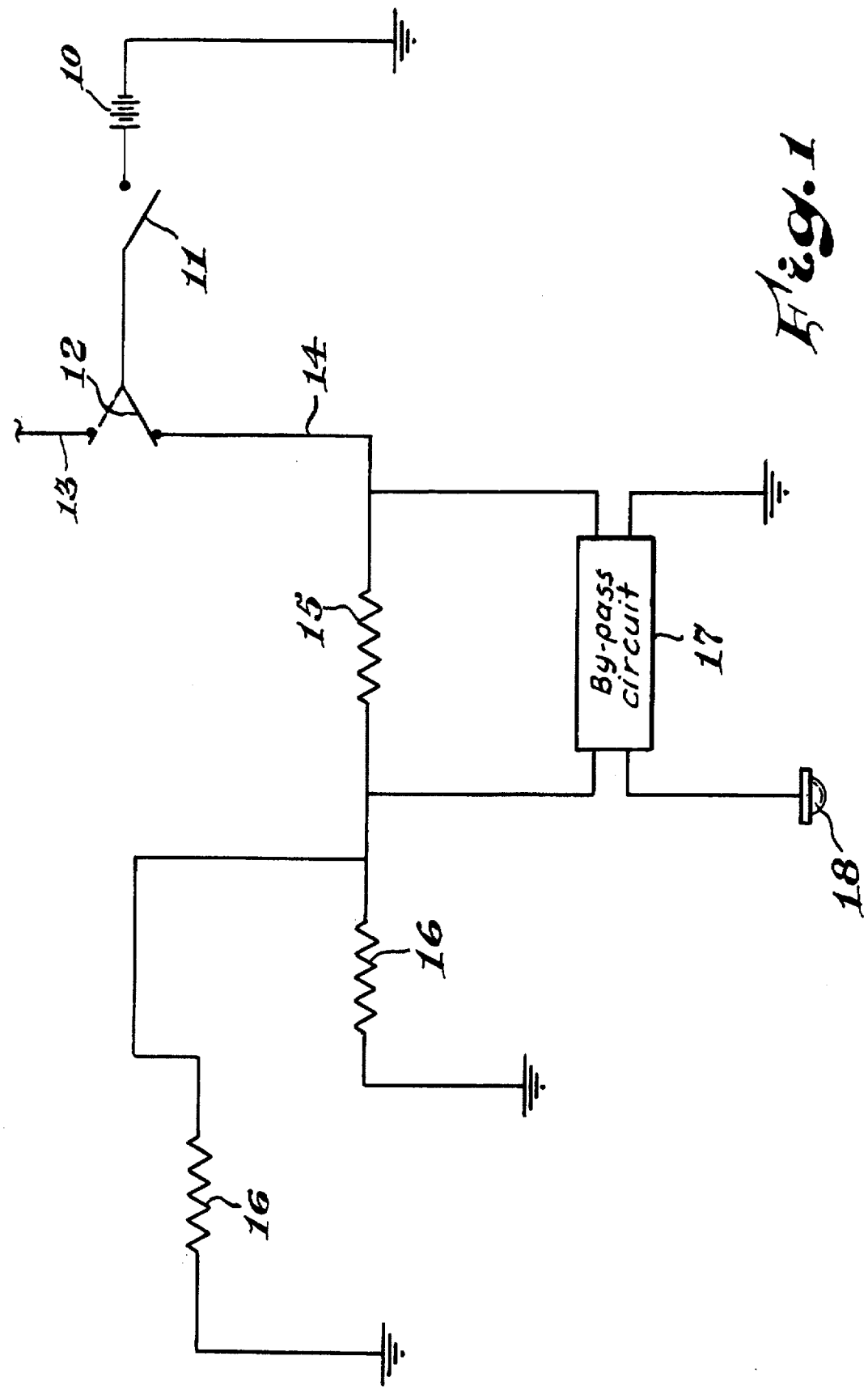

The present invention will be further understood by reference to the accompanying drawing wherein FIG. 1 is a schematic illustration of a system in accordance with the present invention showing only the low beam circuit of an automotive headlight system, said system having a resistor in series with the low beam headlights and having a by-pass circuit in parallel with said resistor, said by-pass circuit being operated automatically by a photosensitive module.

FIG. 1, ignition switch 11 is seen to close the electrical connection between battery 10 and transfer switch 12, said transfer switch 12 energizing either the high beam headlight circuit 13 or the low beam headlight circuit 14 as desired by the operator. For daytime running light driving current is passed through resistor 15 to low beam headlights 16, thereby reducing the brightness, yet making the automobile more visible. During night or dark hours, photosensor 18 automatically actuates module 17 making a by-pass connection around resistor 15 for the normal operation of the low beam lights for night driving.

It is seen that in the simplified design of the system of this invention, the normal wiring of the vehicle remains as it was, the only changes being that the circuit is run through the existing ignition switch 11 instead of a light switch, a resistor 15, is installed in the existing low beam circuit, and module 17 is installed in parallel with the resistor 15.

The simplified system of this invention conserves energy during daylight hours, is easily installed in automobiles and trucks and automatically changes the circuit for daytime driving to dark or nighttime driving and vice versa as required.

Various modifications may be made in the present invention without departing from the spirit or scope thereof as will be readily apparent to those skilled in the art.

I claim:

1. In an ignition activated automotive headlight system having a high beam circuit and a low beam circuit, said low beam circuit having a resistor in series connection therewith for daylight driving, the improvement comprising providing a photoelectrically operated by-pass circuit in parallel with said resistor, said by-pass circuit permitting normal operation of said low beam circuit for nighttime driving.

* * * * *